Figure 1:
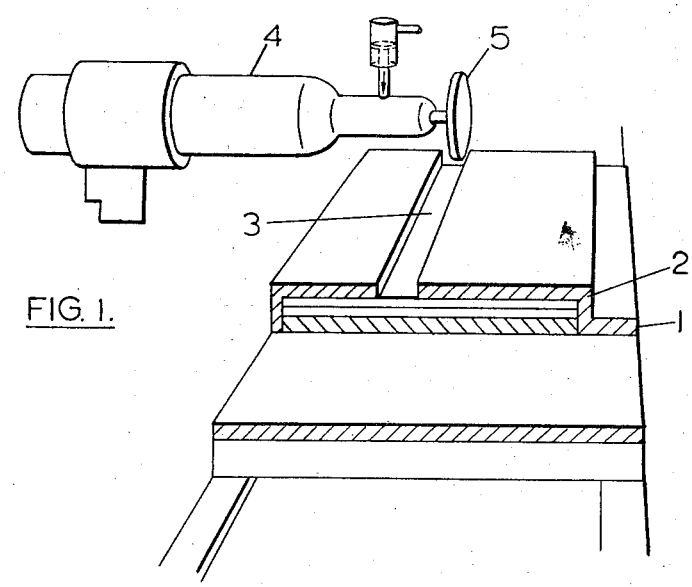

United States Patent [19]
Luc

[11] 3,831,262
[45] Aug. 27, 1974

[54] METHOD OF BONDING METAL PARTS BY FRICTION

[76] Inventor: Penelope Jane Vesey Luc, 18, rue Fourcroy, Paris 17e, France

[22] Filed: Mar. 3, 1972

[21] Appl. No.: 231,703

Related U.S. Application Data

[63] Continuation-in-part of Ser. No. 830,831, June 6, 1969, abandoned.

[30] Foreign Application Priority Data

Mar. 9, 1971  Great Britain .................. 6344/71

[52] U.S. Cl. ............... 29/470.1, 29/470.3, 156/73, 228/1, 228/2
[51] Int. Cl. ............................................ B23k 21/00
[58] Field of Search ........ 228/1, 2; 29/470.1, 470.3, 29/492; 156/73

[56] References Cited
UNITED STATES PATENTS

| | | | |
|---|---|---|---|
| 3,217,957 | 11/1965 | Jarvie et al. | 228/1 |
| 3,292,838 | 12/1966 | Farley | 228/1 |
| 3,418,196 | 12/1968 | Luc | 29/470.1 X |
| 3,455,015 | 7/1969 | Daniels et al. | 29/470.1 |
| 3,466,737 | 9/1969 | Hanink | 29/492 |

*Primary Examiner*—J. Spencer Overholser
*Assistant Examiner*—Robert J. Craig
*Attorney, Agent, or Firm*—Kenyon & Kenyon Reilly Carr & Chapin

[57] ABSTRACT

Two or more metal parts are joined by a frictional process in which the parts are held in intimate contact while a rapidly rotating wheel is applied to one of them. The frictional process may produce vibrational energy in a wide band of sonic and ultrasonic frequencies and an intense, very short, pulse of thermal energy at the interface. Joints may be produced without apparent indications of fusion at the interface.

13 Claims, 16 Drawing Figures

METHOD OF BONDING METAL PARTS BY FRICTION

This application is a continuation-in-part application of application Ser. No. 830,831, filed June 5, 1969 (now abandoned).

The present invention relates to processes for the formation of joins between metals, by direct metal-to-metal adhesion or cohesion.

Conventionally, processes for joining metals involve adhesion, where a dissimilar material is used to join two metals — i.e., soft soldering, brazing, or cohesion where the materials to be joined with or without chemical or physical modification, become integral with each other. Examples of cohesive joints are 1. fusion welds made without pressure application require liquification and resolidification of the metal to produce the weld. The result is a cast structure.
2. Pressure welds where heated unliquified metals are joined by the application of high pressures which "upset" and thin the metal in the weld area. For example is friction welding unit pressures may be in the range 2.5 kg/mm$^2$ to 25 kg/mm$^2$ for very hard special steels accompanied by considerable, upsetting of the metal while it is in the plastic state.

The joint in the process of the present invention is produced by a frictional process in which the two metal parts to be joined together are held in intimate contact in the area in which the joint is to be formed and are subjected while in intimate contact to a frictional treatment on a working surface opposite to the surface of the parts to be bonded, the frictional treatment including a relative movement of a frictional tool and the working surface. The working surface may be a surface of a part to be joined or may be the surface of an intervening layer of material.

It has to be stressed that in the present process the pressures applied are only those which are sufficient to keep the parts to be joined in intimate contact. These pressures are of a quite different order from the pressures needed in forge or friction welding processes. In the present process the total thickness of the joined parts is not substantially less than the total thickness of the component parts before joining.

Examples of metals which can be joined together include iron, steel, tin coated steel, tin free steel (e.g., chrome-chrome oxide coated steel), tin, aluminium, titanium, magnesium, silver, gold, platinum, copper, zinc, nickel and their alloys. The metal parts joined together may be of the same metals or dissimilar metals.

The process may be applied in the formation of line joins such as seams, or spot joins in the manner of spot welding.

The possibility of joining metals without the use of flux or other cleaning agent or solder represents a considerable advantage and although the strength of the joint may be improved by such cleaning, satisfactory joints can be obtained even when the surfaces are contaminated by solid or liquid materials or are modified e.g., by oxide layers.

Substantially continuous seams having such bonds can be formed easily with only comparatively low energy requirements, compared to those used in e.g., resistance welding.

Joints by the process of the invention do not show evidence of the characteristics of fusion or pressure welds made as discussed above.

Metallurgical examination of joins obtained by the process show that they are not the result of a fusion process and no cast structure is present at the interface, rather a solid state weld has occurred with little or no thinning or upsetting in the weld area due to the low pressures applied even to thin foils or sheet. It has also been shown that several distinct types of join can be obtained by varying process parameters. For example, high tensile strength joins have been obtained in copper (by high speed seam welding with low pressures and high rotary tool speed) without disturbing the original grain structure of the metal in the join area. An example is described below. In these joins no interface can be distinguished in the unetched condition, but when etched a thin line is distinguishable at the interface and its thickness can be compared to the grain boundaries of the metal. The nature of this line has not yet been ascertained but it does not appear to interfere with the tensile strength of the joint itself. A similar joint, but with the occurrence of large size grain growth throughout the joint area of the sample has been obtained in aluminium, and yet a further type of result illustrated later has been obtained using increased pressure and lower welding speed, in both steel and titanium. In the steel a completely cohesive joint has occurred and only minute signs of the probably location of the original interface are visible at X 1000, the flattened grain structure of the cold rolled steel having changed to an equiaxial structure with grain growth across the interface. In the titanium, where conditions varied across the joint, the interface is still partly visible but has broken up and has completely disappeared in some areas with the formation of large equiaxial grains. This type of joint has often proved stronger than the base metal itself.

It has been shown that when a sufficiently high powered rotary friction tool (e.g: ¾ H.P. or more) is used in combination with a hard friction wheel or head to join metals, an extremely localised pulse of energy is generated which acts to join them together. Investigation of certain aspects of this phenomenon, which is not yet fully understood, has shown that the energy generated can be detected as not only a wide band of vibrational energy in at least the sonic and ultrasonic range, but also as a pulse of thermal energy of extremely short duration. Recorded measurements of the variation of the thermo-electric potential with time both at the interface of the metals and beneath them, at the moment of passage of the friction wheel during the joining operation, show that the temperature sensed by a thermocouple can rise to a maximum peak in a period as short as 5 to 125 m secs. This recorded period of temperature rise may be caused by the response time of the thermocouple and recording system and in consequence the temperature rise which can exceed 1,000°C, may be almost instantaneous. After reaching a maximum it falls rapidly to a temperature of, for example, a few hundred degrees centigrade whereafter the curve flattens out and gradual cooling of the sample ensues. This energy measured as a thermoelectric potential can be detected at the interface of two layers being joined and also at the outer surface of the layer not contacted by the wheel. It is an extremely localised phenomenon and little or no bulk heating of the metal occurs.

Frequency and amplitude analysis of the mechanical vibrational energy between 100 Hz and 160 Khz generated by the process has shown a wide band width in the sonic and ultrasonic range. The maximum amplitude can be shifted by changes in process conditions, and might be obtained between 12.5 KHz and 25 KHz or between 25 KHz and 50 KHz.

The direction of propagation of the mechanical vibrational energy was also studied by changing the position of the accelerometer used to measure this energy with respect to the friction wheel. Comparative measurements were made with the accelerometer sensing energies in the three mutually perpendicular directions. The vibrations appeared to be generated multi-directionally in contrast to the vibration produced in ultrasonic welding. No vibrational energy need be applied to the wheel independently, this energy being generated by the contact of the rotating frictional wheel with the work. The band width of vibrational energy in conventional ultrasonic welding is narrow and the direction of the mechanical vibrations is limited to the direction of the vibrational movement of the tool under the action of the ultrasonic generator. In the present process the vibrational energy is generated "in situ" by the action of the friction tool on the work.

In the present process the amplitude of the vibrational energy and its frequency can be increased or decreased by respectively increasing or decreasing the pressure of the friction tool on the work, and is also dependent on such parameters as frictional tool shape and size, the material of which it is made, the speed at which it is driven, the power of the rotary motor and the friction tool torque as well as the choice of materials, if any, backing the work.

The pulse of thermal energy generated is of course similarly affected by a change in backing material, for example, the use of an insulating, instead of a conductive, backing, can increase the temperature rise of the materials during the welding operation.

Although neither the physical mechanism involved in the metal to metal joins nor the mechanism by which the frictional treatment produces the effects which have been observed are understood or can be fully explained, momentary fusion followed by recrystallisation, all on a submicroscopic scale so that there is no visible interruption of the crystal structures of the two parts, or else interatomic diffusion across the interface, seems to be the most reasonable and consistent explanation available at the moment. It is now known that the frictional treatment produces a wide range of multi-directional sonic and ultrasonic waves in the materials which may act at the interface with great intensity when that interface is metal/metal. This would be consistent with proposals for the mechanism of the joining which occurs in ultrasonic welding, where ultrasonic waves of a single frequency, or of a basic frequency with its harmonics, are generated externally of the parts to be welded and are applied under considerable pressure and in a directional manner through a conductor tip to the parts to form a spot-weld. These mechanistic proposals are found in Gencsoy and others, Welding Research, Supplement to the Welding Journal (American Welding Society), Apr. 1967, 145, and the experimental observations there described seem in many respects to be similar to those made on the present joins.

It should be apparent from the foregoing general discussion that, even if, in the future, this is established to be the mechanistic explanation of the effects produced in the present process, the process steps involved here in producing the effects are completely distinct from ultrasonic welding; also that in the present process additional effects conducive to efficient joining, (e.g., the wide range of frequencies and the multi-directional nature of the waves), are produced.

It has been found that in the present process extremely high energy levels are registered at the interface by an energy-sensitive device: these may be of the order of 1,000°C as measured by a thermocouple. But such temperatures are recorded only for a very short period of time, at a given point of the interface as there is relative movement of the tool and the work.

The metal parts may be in any form such as plate, sheet, web, foil, rod or tube or even a metallisation layer on a sheet, film or fibre. The metal parts which are to join together may be parts of the same integer or may be parts of different integers. One of the metals to be joined may be sandwiched between two other metal parts, e.g., solder or aluminium between two steel sheets.

In the process of the invention the joining may be assisted by the use of auxiliary excitation such as ultrasonic vibration, or electric currents or fields. This application of auxiliary excitation may aid the formation of the join but unless the frictional treatment were applied no join would be formed.

The application of auxiliary excitation does in many cases have the effect of allowing joins of high quality to be formed at a faster rate or with less pressure or in a generally more efficient manner than if the excitation had not been used and also allows the energy used and applied by the frictional tool to be less than would otherwise have been needed to effect the join in any particular situation. The frictional tool itself may be used as the source of auxiliary excitation when being mounted on or as the transducer of an ultrasonic generator, while a rigid backing to the parts being joined serves as an anvil. Alternatively an ultrasonic tool opposed to the friction tool may be the source of ultrasonic energy. Similarly if an electric current or field is to be applied as a means of auxiliary excitation, one or both of the electrodes can be in the form of a rotating friction tool.

Thermal auxiliary excitation can be simple preheating of the materials to a temperature where they are warm or hot but not fused. The heat may be applied by heating the backing or from a source such as radiant heat or a jet of hot gas. However it will be preferable actually to cool the friction wheel itself.

The usual tool used in the formation of these joins should be a hard smooth wheel driven in very swift rotation: usually this will be rotating about an axis generally parallel to the general plane of the interface, and relative speed may be increased by relative bodily motion of the tool and the work, to the extent that, particularly when easily handled, non-massive, thin films or webs are concerned, all the relative motion may derive from this bodily motion so that the tool itself is a stationary foot or horn pressing against the moving material.

The examples of friction wheels are those made of hard or hardened steels such as tungsten carbide, carbon steel, chrome nickel or molybdenum alloy steels or those made of "Vespel" (a Registered Trade Mark of DuPont) or of "Tufnol" (a registered Trade Mark of Tufnol Ltd) and the wheels may be filled or reinforced to resist wear and the centrifugal forces which act on them when they rotate at high speeds. The diameters may be suitably between 4 and 10 cms and speeds of rotation between 3,000 and 45,000 rpm or above. For example, one suitable motor is a ¾ power electric motor taking 600 watts and capable of speeds of 54,000 rpm although more powerful motors of 1 to 3½ horse power have been successfully used.

The parts may be backed, when pressure is applied to them by a stationary sheet, travelling band or a wheel or a roller.

Pressure applied (either directly and wholly by the tool or partly by the tool and partly by the additional pressure exerting means) will vary widely according to the thickness and other characteristics of material(s) being joined. For example when metal sheet is joined to itself pressures in the order of 50 g/cm$^2$ to 100 g/cm$^2$ or more may be applied from an external pressure source to bring the sheet parts into sufficiently close contact for bonding to occur as a result of application of the frictional process. In all cases where pressure is applied by the frictional tool alone, applied pressure is much lower than that used either in ultra-sonic or forge welding processes.

During bonding operations and immediately following them it is preferable to assist and to maintain good contact of the interfaces of the materials to be joined, by contact means which are indenpendent of the actual friction source. This will avoid application of high pressure on the work through the friction source such as a friction wheel, and will greatly reduce the energy requirements of the process as well as wear on the friction tool. It will also reduce to a minimum any mark made by the tool on the metal surface with which it is in direct contact. Apart from independent pressure means provided in the seal or bonding area, it is possible for this purpose to provide a vacuum which will hold the materials to be joined in close contact, and it is also possible to exert air pressure on the assembly of materials to be joined. The friction tool can itself be provided with air suction or pressure means to ensure good contact with the materials to be joined.

In cases where materials possess magnetic properties, magnetic materials, such as magnetic particle filled rubber, can also be used as a backing in the weld area to assist interfacial contact.

Lastly, the underpart may when it is strong enough act as the backing, without an anvil or other support behind it.

A wide range of thicknesses of metal sheet can be joined by the process and for example, four tin plated steel blanks (each 240 microns thick) have been superimposed and welded together in a single operation. Moreover, if required it is possible to place a frictional source on either side of the seam to be welded. These may be juxtaposed, or may operate on opposite sides of the seam in a slightly spaced relationship.

Speeds realised in conjunction with the process are very high and for example, metal sheets and foil from 20 to 200 micron thick can be seam joined at speeds of 1 to 2 meters/second, or spot joins of metal to metal can be made in as little as 1/25th second, while the work may be moved past the friction tool or the tool past the work.

Metal to metal joins obtained by the process are often as strong as or stronger than the material itself.

The process is also suitable for the lamination together of metal foils or webs, when the frictional tool suitably takes the form of a comparatively wide roller.

If the product to which the metal foil or sheet is to be laminated itself has raised areas, for example, if it is a metallic honeycomb structure and the foil or sheet is to be applied as a skin to its surface then the honeycomb structure will be covered by the metal skin and conveyed on a table beneath the friction source, which will bond the two together.

In the present process, the frictional tool may be, but is not usually applied to any of the surfaces actually to be secured together. It usually works through the thickness of at least one layer of material by being applied to the surface of a sheet opposite that which is to be joined. It need not contact any of the surfaces of the part to be joined and may work through an intervening layer of a material resistant to the adhesive or cohesive effect of the frictional treatment under the conditions used.

Particularly in the case of metal-metal joining in which the upper or outer layer of material to be bonded is a soft metal such as copper or aluminium, it has been found preferably to lubricate the frictional tool to avoid transfer of metal to its surface and to avoid scarring of the surface of the sheet.

In general it may be said that the thicker the materials to be joined or the harder they are then the more pressure will have to be applied and the more frictional energy will have to be supplied by the tool in a given area to produce an adequate join. Specific examples of processes will now be given.

Figure 2:
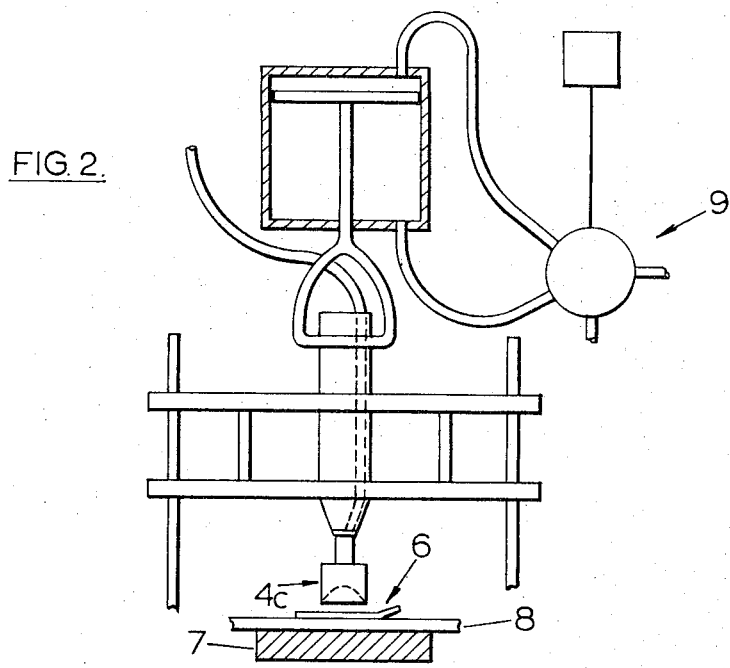
Figure 3:
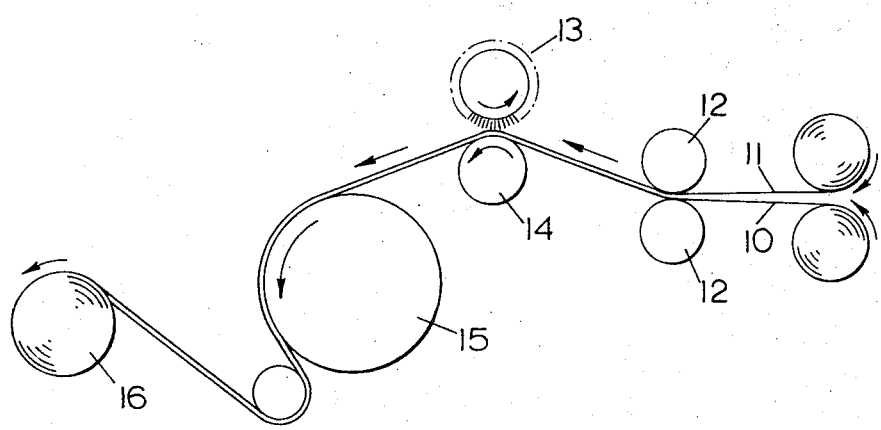
Figure 4:
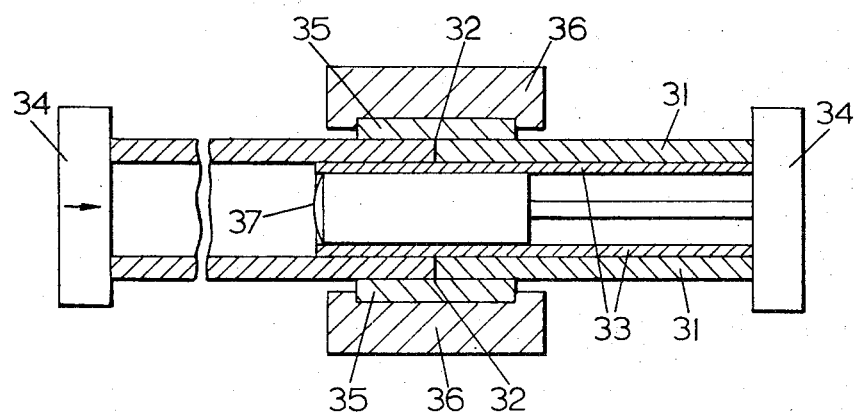
Figure 5A:
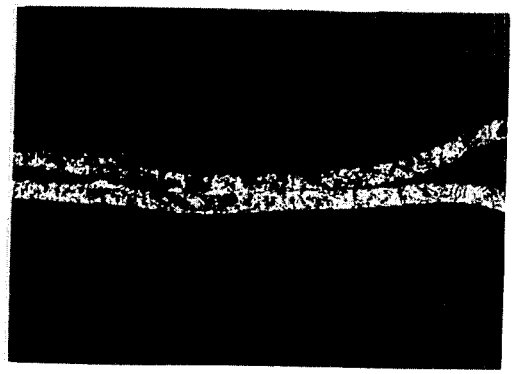
Figure 6A:
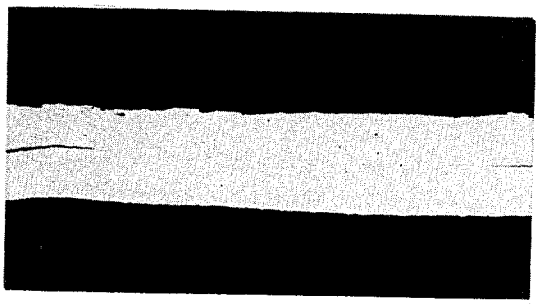
Figure 7A:
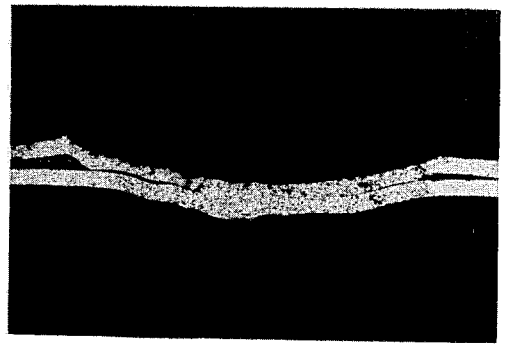
Figure 7B:
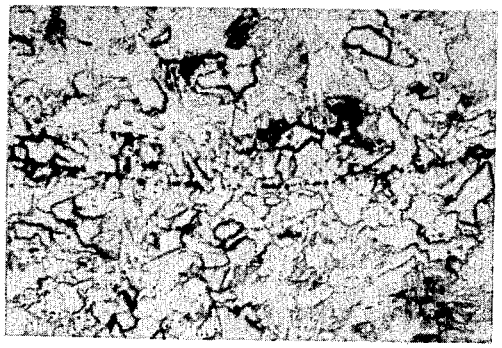
Figure 7C:
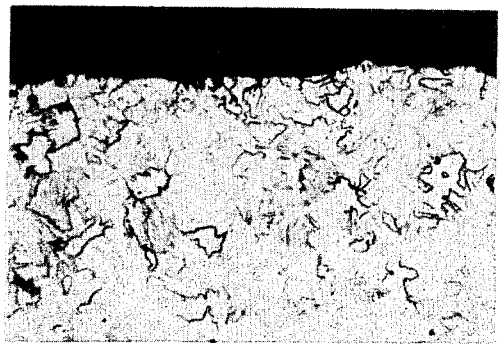
Figure 7D:
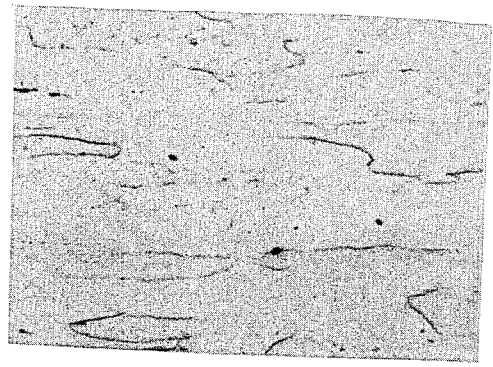
Figure 8:
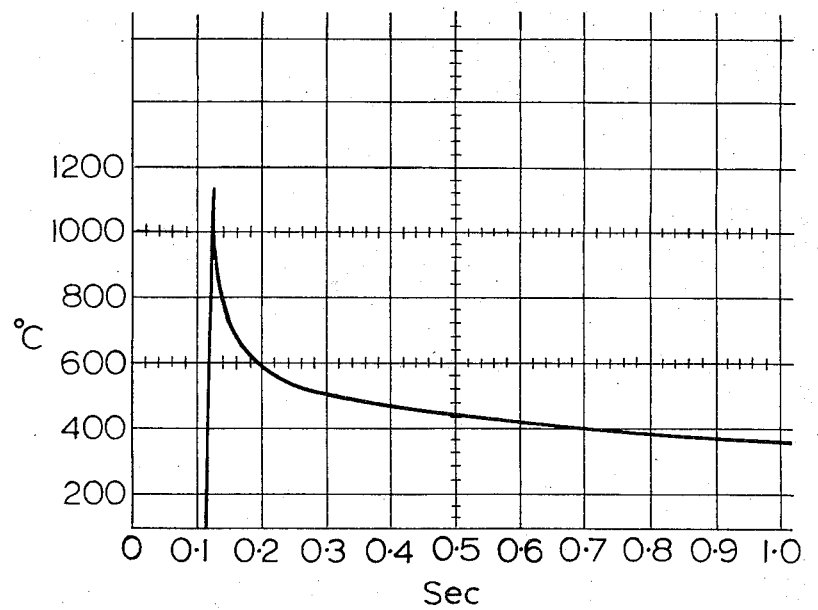
Figure 9:
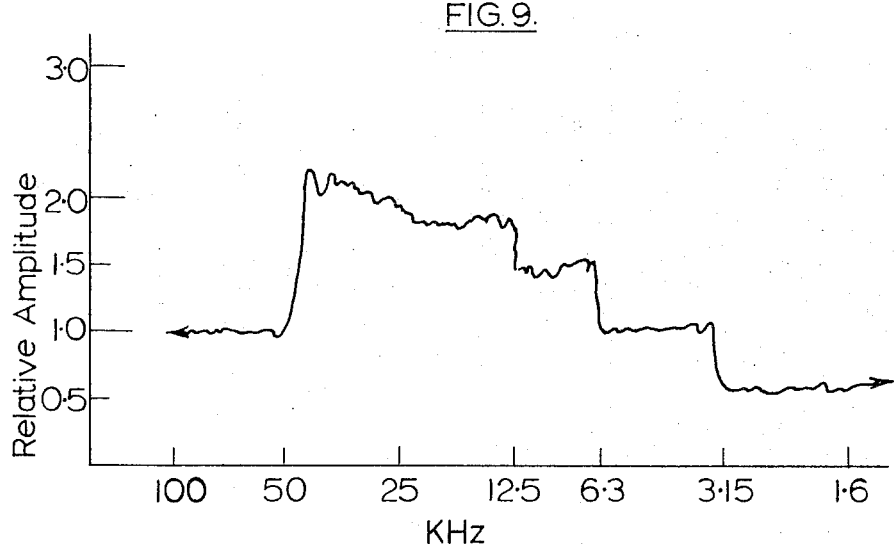

Particular processes and joins embodying the present invention will now be described with reference to the accompanying drawings wherein:

FIG. 1 is a perspective diagrammatic view and FIGS. 2, 3 and 4 are side diagrammatic elevations, of respective embodiments of apparatus for carrying out such processes FIGS. 5A, B and C are photomicrographs of a first join FIGS. 6A, B and C are photomicrographs of a second join FIGS. 7A to D are photomicrographs of a third join FIG. 8 is a graph showing temperature readings and FIG. 9 is a graph showing frequency distributions.

EXAMPLE 1

The joining of tin-free-steel (chrome-chrome oxide coated) 190 microns thick to a similar sheet.
(Using apparatus illustrated in FIG. 1)

Two pieces of sheet steel are clamped upon a table against an asbestos backing 1 covered with "Teflon" (du Pont Registered Trade Mark) coated glasscloth. The clamps 2 apply pressure in the order of 50 – 100 lbs cm$^2$ to the sheets to ensure good contact at the interfaces to be joined, but a gap 3 is left in the clamping means (in the area in which the join is required), to allow passage of the friction tool 4 as the table carrying the work moves past it. The table is provided with a drive which in this example moves past the friction tool at a speed of 40 cms/sec. The friction tool is clamped in a stationary position, and pressure applied in the contact area by the wheel on the steel sheet is in the order of 2 – 3 lbs. The friction wheel 5 is a coated and hardened steel of 5.5 cms.diam and with a working and contoured surface 2 mm wide, and it is driven by a ½ h.p. rotary motor controlled by a Variac Transformer, and set to provide 80 percent power input to the motor.

The wheel is set in motion prior to contact of the wheel with the work and in the same direction as the traverse movement of the table carrying the work. A line join of from 1 to 2 mms wide is achieved having a strength exceeding 200 lbs inch. A true metallurgical bond is achieved. Webs of thin steel can also be laminated according to the method of the invention in a continuous process which transports the steel parts to be joined past a stationary friction tool. In the apparatus of FIG. 3, webs 10 and 11 of thin steel are passed between feed rolls 12 to between a friction tool in the form of a drum 13 and a backing roll 14. After passing over a feed and cooling roll 15 the laminated web is wound up on a core 16.

EXAMPLE 2

The welding of a sheet of silver 100 microns thick to a similar sheet.

To demonstrate the possibility of bonding surfaces having a contaminated surface, two pieces of highly tarnished silver sheet were placed over each other on the traverse table and as described in Example 1, but a soft backing of silicone elastomer rubber was used, covered with a release coated glass-cloth. The steel wheel was replaced by one of "Vespel" (du Pont Registered Trade Mark) a filled polyimide resin material having a diameter of 3.5 cms and a working surface of 1.5 mm. Power input to the rotary tool is 50 percent on the Variac transformer and the table passes the friction head at 40 cms sec. Contact pressure of the tool on the work is in the order of 1 to 2 lbs. The silver sheets are joined together with a very strong join.

EXAMPLE 3

The joining of silver sheet 100 micron thick to gold sheet 260 microns thick.

The example is as in Example 2 above but the lower sheet of silver is replaced by a gold sheet, and speed of traverse of the table is reduced to 20 cms sec. The silver is joined to the gold with a strength in excess of the tensile strength of the silver sheet which breaks before the join itself, in both peel and sheer tests.

EXAMPLE 4

The joining of a circular type steel opening device to an aluminium drum.
(Using apparatus as illustrated in FIG. 2)

A discontinuous welding method is used in this example, the rotary tool being attached in a vertical position to the surfaces to be welded. The steel opening device 6 of 200 micron steel is clamped to the aluminium drum top 8 or to its side, while magnetic backing means 7 increase its contact with the drum. The rotary tool used is of a cylindrical type (4C) and is made of tungsten carbide steel. The face of the tool has a flat exterior rim 3 mms wide which comprises its working surface while the inside surface is concave and does not contact the work. The tool is brought into contact with the work through a hydraulic system 9 which also controls pressure of the tool on the work, while time of contact is controlled electronically. The motor driving the rotary tool is a 1 h.p. rotary motor and the dial setting on the Variac transformer is 100 percent, the tool being set in motion before contacting the work. Contact time of the tool with the work is 1 sec. The opening device is joined to the aluminium drum so that when its "handle" is lifted it tears the aluminium in an indented area.

EXAMPLE 5

The joining of a sheet of tin 140 microns thick to a similar sheet.
(Using the apparatus of FIG. 1).

Two sheets of tin are clamped in position as in Example 1, FIG. 1, but the Variac transformer dial setting is 70 percent and the speed of traverse of the mobile table is 50 cms sec. Pressure at the contact point of the friction tool and the work surface is in the order of 2 lbs. The tin is welded to the tin with a very strong joint of a shear strength exceeding 200 lbs inch. According to the parameters under which the process is applied the interfacial joint may be one in which the tin coating joins to the other tin interface or the base steel to the base steel, and in particular control of pressure and relative speed will permit control of the type of joint obtained. For example a slight increase in applied pressure and in relative speed of the friction tool will increase joint strength of the above mentioned samples.

In a variant a very thin ribbon of solder (tin) is placed between the interfaces of the tin sheets in the area where they are to be joined. Friction is applied as before, but with a slight pressure increase, joining the tin sheets together with an extremely strong bond.

Steel, including plate steel, for Example 1 mm thick, can be similarly joined, but the interfaces must first be thoroughly cleaned before applying either a strip of solder or solder in liquid form. Pressure applied by means exterior to the friction tool must also be greater than the thickness and rigidity of the steel or other metal plate. Alternatively the interfaces may be brought into intimate contact by the use of magnetic materials or fields, electrical fields, vacuum means and the like.

EXAMPLE 6

The welding of plate steel to plate steel 1 mm thick.

(Using the apparatus of FIG. 1)
The two sheets of steel are clamped into position against magnetic backing means. A wheel of special hardened steel with a wear resistant working surface is used and has a diameter of 56 mm and a working surface of 3 mm wide. Input through the transformer is 100 percent and the speed of passage of the work past the friction tool is 10 cms sec. In this manner the steel plates are strongly joined together. It has been found preferable to clean the steel sheets carefully before welding to converse energy and secure an improved join.

EXAMPLE 7

The welding of two pieces of aluminium tubing with a butt joint.
(Using the apparatus illustrated in FIG. 4)

Two pieces of aluminium tubing 31 having a circumference on the outside of 6 cms and walls 300 microns thick are prepared for joining. Although in this example a butt joint is made it should be understood that an overlap joint can be made by the same means, or the tubing can be seamed in the longitudinal direction. In this example an inner hollow mandrel 33 of hard release coated and lubricated steel, is first inserted into the tubes to support them in the joint area and to serve as an intervening material to the friction tool, to prevent it directly contacting the tube walls. The abutting edges of the pipes are held together under pressure in a clamp 34, which pressure will continue as welding proceeds. An outer mandrel, 35 which also serves as an intervening material between the outer die and the pipes is placed around the joint area of the pipes so that it holds the abutted ends firmly in position. Both the inner and outer mandrels remain stationary in respect of the aluminium tube. An outer die 36 contacts the outer mandrel in the joint area and can itself be rotatable. The tubes themselves are attached to drive means to cause them to rotate in unison. A friction tool 37 of hard steel is inserted into the inner mandrel and caused to rotate at 30,000 rpm while in this example, the tubes themselves are set into counter rotation at a speed of 6,000 rpm, causing a high relative speed differential while pressure is simultaneously applied to force the pipes into close contact. Operating time is 3 minutes, and a cooling time is allowed before dissembling the apparatus. It will be found that the metal formed an almost invisible butt joint.

Some examples of bonds formed by processes within the invention are shown in the photomicrographs which are FIGS. 5 to 7 of the accompanying drawings.

EXAMPLE 8

Figure 5B:
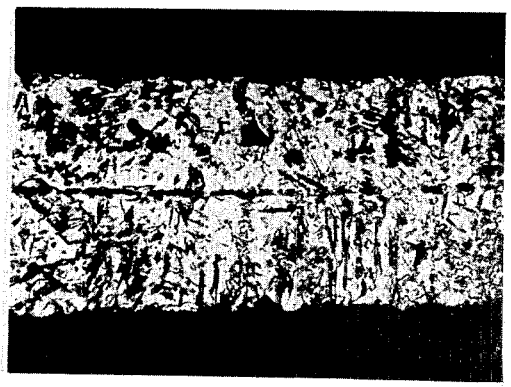
Figure 5C:
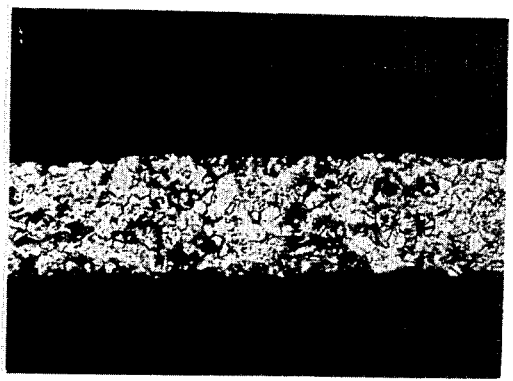
Figure 6B:
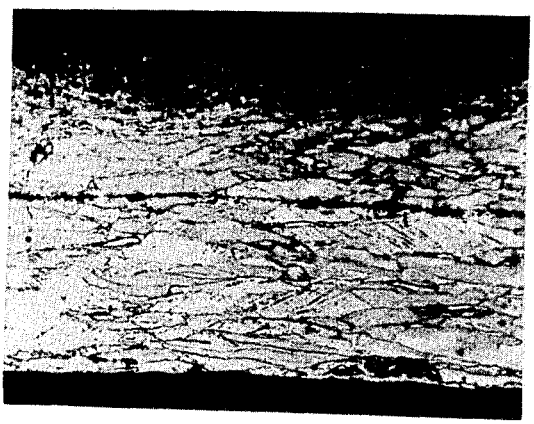
Figure 6C:
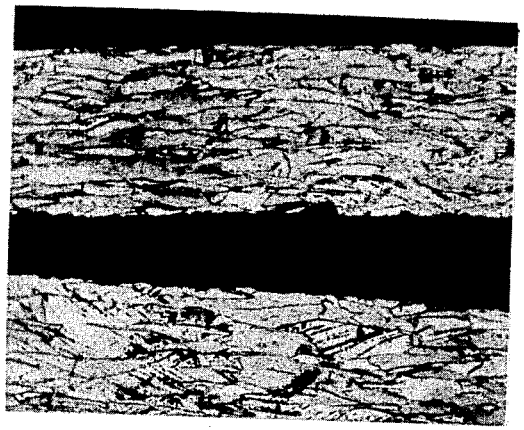

FIG. 5A shows an etched cross section through the seam line of a bond between two titanium sheets of 130 m (1 m 10 m) thickness which were bonded by applying to the upper surface in FIG. 5A the periphery, 3 mm wide of a Vespel (Registered Trade Mark) wheel of 5 cms diameter rotating at a speed of 50,000 rpm. The pressure applied at the point of contact of the wheel was 2 kg. The under layer of material was supported on a rigid insulating backing surface. The wheel was traversed along the join line at a speed of 50 cms second. The cross section in FIG. 5A shows how there is substantially no thinning of the parts where the wheel was pressed against them, and FIG. 5B which is at a magnification of 1,000 shows grain growth across the interface in several areas. The materials were not cleaned before the experiment and the dark line indicating the interface position in FIG. 5B is thought to be an inclusion of residual oxide or dirt, not air. An attempt to peel one sheet from the other resulted in metal being torn from one sheet. FIG. 5C shows the crystal structure away from the join area.

It goes without saying that the ability to weld titanium to titanium is an important consideration.

EXAMPLE 9

In this example FIG. 6A is at a magnification of 100 and is an unetched cross section of a joint between two sheets of copper 100 m thick acted on by a "silver steel" wheel 2 mm wide and of a diameter of 5 cms rotating at 36,000 rpm, with a pressure of 5 kg/cm on the tool. The speed of travel of the work was 10 cm/sec. In the unetched photomicrograph which is FIG. 6A no interface can be seen at all in the region of the bond but upon etching as in FIG. 6B which is at a magnification of 350 a thin line can be seen at the interface. There is however substantial continuity of the join right up to and through the interface line. Although that line is still visible in general, there are areas where it has disappeared. It is noteworthy that at the upper surface shown in FIG. 6B (the one against which the wheel acted) there is evidence of fusion having occurred but there is none at the interface. It is also noteworthy that in this case (compare Example 10) the grain structure of the metals across the thickness of the two parts is unchanged from the original cold-rolled structure which they had (compare FIG. 6C, which is away from the joint area). The tensile strength of the joint was tested and found to be greater than that of the sheet metal.

EXAMPLE 10

In these FIGS. 7A to D are shown cross sections of parts of a join formed between two low carbon steel plates (0.15 mm thick) by pressing on the upper surface of the upper one by means of a wheel 2 mm wide and of a diameter of 5 cms rotated at a speed of 36,000 rpm. The pressure exerted on the barrel of the friction tool was 20 Kg and the speed of traverse of the wheel along the bond line was 5 cm/sec.

There are lubrication applied between the wheel and the surface on which it acted. The underplate was supported on a resilient backing.

FIG. 7A is at 30 X magnification and shows the whole of the bond region and the extent to which joining between the two strips is achieved without thinning or otherwise upsetting them. FIG. 7B is at a magnification of 1,000 and shows a cohesion marked by recrystallization and large size grain growth across the interface. There is continuity of structure across the interface. The structure of the steel is similar across the whole thickness of the bond region as can be seen by comparing plates 7B, C and D and that there has probably been energy present during the formation of the bond sufficient to recrystallise the whole structure (compare FIG. 7D where the crystal structure of the steel away from the join is shown). There is no sign even of incipient melting in the bond region. At the top surface (the one on which the lubricated wheel has borne), there is no sign of crystal structure reorganisation.

The way in which temperature varies at the interface between metal parts is illustrated by the graph shown as FIG. 8.

This is a reproduction of a cathode-ray tube trace obtained from a thermocouple at the interface of two steel sheets, each 0.15 mm thick, at a speed of bodily movement between the tool and the sheets of 2 cm/sec, and the pressure exerted on the axis of the wheel being 0.8 kg/cm . The tool was a wheel of "silver steel", of axial thickness 2 mm at its circumference, and a diameter of 5 cm, rotating at 36,000 rpm.

The peak temperatures recorded is approximately 1,100 C, reached in about 0.01 second, decayed to 800 C within 0.02 second and to 400 C within 0.5 sec.

The wave spectrum between 1.6 KiloHertz (KHz) and 100 KHz generated by frictional contact between a wheel of "silver steel," 5 cm in diameter, 2 mm in axial width at its circumference and rotating at 36,000 rpm and a steel sample 0.15 mm thick backed by a metal bar and fitted with a directional accelerometer, is shown in FIG. 9. A pressure of 1 kg/cm$^2$ is applied to the wheel, and the sample is moved past the wheel at 2 cm/sec. Vibrations are generated in the sonic and ultrasonic ranges, with maximum amplitude at between 30 and 40 KHz in the ultrasonic range.

In this text the accelerometer was parallel to the direction of bed travel. Substantially similar results were obtained in orthogonal planes.

Articles which can be fabricated by using processes and joins of the present invention include, e.g. electronic equipment or component casings, assembly of electrical or electronic circuits, heat exchangers, reaction vessels, tear strip handles.

In general, when the speed of the rotary tool is increased linear welding speed can be increased or pressure decreased. Conversely if pressure is increased rotary tool speed can be reduced, or speed of joining increased, while a reduction in joining speed will require a reduction in applied pressure and/or frictional tool speed.

To take an example, when joining copper to copper a joining speed for a seam weld can be 10 cms/sec, pressure applied to the friction tool barrel as low as 5 kg/cm$^2$ and rotary tool speed 36,000 rpm. If applied pressure is increased to 10 kg/cm$^2$ rotary tool speed can be reduced to 15 – 20,000 rpm, while welding speed is maintained.

What I claim is:

1. A method for joining together metal parts at a predetermined interface of the parts formed by facing surfaces of each of the parts, comprising the steps of:
   i. disposing the parts to be joined in a facing relationship in which predetermined surfaces of the parts are held in intimate contact to form an interface between the parts at such predetermined surfaces, which interface includes a plurality of incremental areas of contact between the parts,
   ii. subjecting a working surface to a frictional treatment, the working surface including one of:
      a. a surface of one of the parts other than the surface of the one part at the interface, and
      b. a surface of an intervening layer of material located in intimate contact with a surface of one of the parts other than a surface of the one part at the interface,
   and the working surface being adjacent the surface of the one part at the interface, and the frictional treatment comprising applying dynamic rubbing friction resulting from the relative movement of a tool and the working surface in contact with the tool; and
   iii. maintaining the subjecting of the working surface to the frictional treatment at each incremental area of the working surface for a time sufficient to provide a quantum of energy at a corresponding incremental area of the interface, the quantum of energy being capable of causing, and causing the parts to be joined together in the incremental area of the interface.

2. A method according to claim 1 wherein the step of subjecting a working surface to a frictional treatment includes the operating of the tool in contact with the working surface to produce a wide range of sonic and ultrasonic waves multidirectionally in the metal parts to be joined.

3. A method according to claim 1 wherein the step of subjecting a working surface to a frictional treatment includes the operating of a tool in contact with the working surface to produce at the interface an extremely high energy level, as measured as temperature, for an extremely short period of time.

4. A method according to claim 1 in which the step of subjecting the working surface to a frictional treatment includes operating a tool to create relative movement between the working surface and the tool equivalent to the movement of a rotating wheel of between 4 and 10 centimeters in diameter rotating at at least 3,000 revolutions per minute while in tangent contact with a working surface.

5. A method according to claim 1 in which the step of subjecting a working surface to the frictional treatment includes the applying of dynamic rubbing friction to the working surface with a rotating tool with an energy equivalent to the energy of a wheel being driven by a motor of at least 1 horsepower while in contact with the working surface.

6. A method for bonding layers of metal in which an intermediate layer of metal is disposed between facing surfaces of the layers of metal to be bonded comprising the steps of:
   i. assembling the layers of metal to be bonded with the intermediate layer of metal being disposed between facing surfaces of the layers of metal to be bonded in the area of the metal layers where the layers are to be bonded, the opposite surfaces of the intermediate layer of metal being disposed in intimate contact with facing surfaces of the layers of metal to be bonded,
   ii. subjecting, while each opposite surface of the intermediate layer of the assembly is in intimate contact with the adjacent facing surface of the layers to be bonded, a working surface of the assembly, to a frictional treatment, the working surface including one of:
      a. a surface of one of the layers other than a surface of the layer disposed in intimate contact with the intermediate layer of metal, and
      b. a surface of an intervening layer of material located in intimate contact with a surface of one of the layers other than a surface of the layer disposed in intimate contact with the intermediate layer of metal, and the working surface being adjacent the location of the intermediate layer of metal, and the frictional treatment comprising applying dynamic rubbing friction to the working surface, the dynamic rubbing friction resulting from the relative movement of a tool and the working surface in contact with the tool; and;
   iii. maintaining the subjecting of the working surface to the frictional treatment for a time sufficient to provide sufficient energy to cause the layers to be joined together by causing homogenous metal grain combination at the respective facing surfaces of the layers which comprise the assembly.

7. A method according to claim 6 in which the step of assembling the layers of metal includes the disposing of an intermediate layer of metal having an affinity for the layers of metal to be bonded.

8. A method according to claim 7 in which the disposing of an intermediate layer of metal having an affinity for the layers of metal to be bonded comprises disposing a metal dis-similar to the layers of metal to be bonded.

9. A process according to claim 7 in which the disposing of an intermediate layer of metal comprises the disposing of a soldering material in solid form between layers of metal to be bonded.

10. A method according to claim 6 in which the step of maintaining the subjecting of the working surface to the frictional treatment includes the creation of a wide range of sonic and ultrasonic waves multi-directionally in the parts and further creates, at the interfaces of the assembly, an extremely high energy level, as measured as temperature, for an extremely short period of time, the short period of time corresponding to the application of dynamic rubbing friction to the working surface and the measure of temperature corresponding to and being of a lesser magnitude then the melting temperature of the metals bonded.

11. A method according to claim 10 in which the step of maintaining the subjecting of the working surface to the frictional treatment includes the subjection of the working surface to a frictional treatment equivalent to the movement of a hard rotating wheel of between 4 and 10 cms in diameter rotating at at least 3,000 rpm while in tangent contact with the working surface.

12. A method according to claim 10 in which the step of maintaining the subjecting of the working surface to the frictional treatment further includes treating the working surface to provide at the interface energy equivalent to the energy provided by a hard wheel being driven by a motor of at least 1 horsepower while in tangent contact with the working surface.

13. A method for joining together metal parts at a predetermined interface of the parts formed by facing surfaces of each of the parts, comprising the steps of:

i. disposing the parts to be joined in a facing relationship in which predetermined surfaces of the parts are held in intimate contact to form an interface between the parts at such predetermined surfaces, which interface includes a plurality of incremental areas of contact between the parts, ii. subjecting a working surface to a frictional treatment, the working surface including one of:

a. a surface of one of the parts other than the surface of the one part at the interface, and b. a surface of an intervening layer of material located in intimate contact with a surface of one of the parts other than a surface of the one part at the interface, and the working surface being adjacent to the surface of the one part at the interface, and the frictional treatment comprising applying dynamic rubbing friction to the working surface, the dynamic rubbing friction resulting from the relative movement of a tool and the working surface in contact with the tool;

iii. maintaining the subjecting of the working surface to the frictional treatment at each incremental area of the working surface for a time sufficient to provide a quantum of energy at a corresponding incremental area of the interface, the quantum of energy being capable of causing, and causing, the parts to be joined together in the incremental area of the interface; and iv. applying lubrication between the tool and the working surface during one of before and during the step of maintaining the subjecting of the working surface to the frictional treatment.

* * * * *

UNITED STATES PATENT OFFICE
CERTIFICATE OF CORRECTION

Patent No.   3,831,262                    Dated   August 27, 1974

Inventor(s)   Penelope Jane Vesey Luc

It is certified that error appears in the above-identified patent and that said Letters Patent are hereby corrected as shown below:

Column 1, line 23, after "For example", "is" should be --in--.

Column 5, line 31, "indenpentent" should be --independent--.

Column 9, line 40, "130m (1m u 10M)" should be --130um $(1um=10^{-9}n)$--.

Column 9, line 66, "100m" should be --100um--.

Signed and sealed this 7th day of January 1975.

(SEAL)
Attest:

McCOY M. GIBSON JR.
Attesting Officer

C. MARSHALL DANN
Commissioner of Patents